Patented Sept. 6, 1932

1,876,213

UNITED STATES PATENT OFFICE

THOMAS EWAN, OF NORTON-ON-TEES, ENGLAND, ASSIGNOR TO IMPERIAL CHEMICAL INDUSTRIES LIMITED, OF LONDON, ENGLAND

CATALYST FOR PRODUCTION OF HYDROCYANIC ACID

No Drawing. Application filed January 2, 1929, Serial No. 329,949, and in Great Britain February 10, 1928.

The present invention relates to an improved catalyst for the manufacture of hydrocyanic acid by dehydration of formamide. It is known that when formamide vapour, alone or together with other gases, is passed over a dehydrating catalyst, it decomposes according to the equation

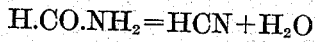

$$H.CO.NH_2 = HCN + H_2O$$

Among the dehydrating catalysts which it has been proposed to use is vitreous alumina obtained by quickly heating dried precipitated alumina to a red heat, when the mass cracks and breaks up into small grains.

It has now been found that such catalysts are too active, in that formamide is partly decomposed by them into ammonia and carbon monoxide, and that consequently a less active form of alumina should be used.

This may be obtained for example by igniting alumina for several hours at a very high temperature, for example 1400° C.–1500° C. for at least ten hours. This diminishes the activity and enables good yields of hydrocyanic acid to be obtained at reasonable space velocities.

The higher the temperature the shorter is the time for which the alumina has to be heated.

Thus for example a good catalyst may be prepared by heating alumina to incipient fusion in the oxyhydrogen flame.

Commercial fused alumina such as that known as alundum gives quite good results but pure alumina is better.

Instead of alumina other similar dehydrating catalyst such as zirconia and thoria can be used.

Example 1

Formamide was vaporized by allowing the liquid to fall, drop by drop, on to a heated surface, care being taken that each drop became vaporized before the next arrived, and the vapours were passed through a heated tube 6 inches long and ½ inch in diameter, which contained the catalyst: the products were passed into dilute caustic soda solution and analyzed.

When pure alumina, made from pure aluminium nitrate and ammonia, was used as a catalyst, the formamide was practically completely decomposed into carbon monoxide and ammonia showing with the shortest contact time that could be realized the catalyst was far too active. By igniting the alumina at a high temperature satisfactory results were obtained, as is shown by the following table

| Heat treatment of alumina | Contact time (Temp. 500° C.) | Yield of HCN |
|---|---|---|
|  | Seconds | Per cent |
| 1¼ hours at 1,000° C | 1.7 | 12.5 |
| 2½ hours at 1,400° C | 1.9 | 19.9 |
| 10 hours at 1,400° C | 2.1 | 87.5 |

At a temperature of 600° C., yields of 30.6 per cent. and 91.5 per cent. were obtained using the catalyst treated for 2½ hours at 1400° C. and for 10 hours at 1400° C. respectively.

Example 2

The procedure described in Example 1 was followed with the substitution of zirconia for alumina as catalyst. The precipitated oxide gave, at a temperature of 500° C. and with a contact time of 0.16 seconds, a yield of 38 per cent. With greater contact times the yields were less. By heating the zirconia to a temperature of 1500° C. for a period of 1½ hours, the yields were greatly improved. At a temperature of 500° C., and with contact times ranging from 0.55–1.79 seconds a yield of 50 per cent. was obtained: at 600° C., and with contact times from 0.09–0.73 seconds, the yield was 71.4 per cent.

I declare that what I claim is:—

1. Process of obtaining hydrocyanic acid from formamide which comprises vaporizing formamide and passing the formamide vapor over a dehydrating catalyst which has been previously heated to a temperature exceeding 1000° C. for at least ten hours.

2. Process of obtaining hydrocyanic acid from formamide which comprises vaporizing formamide and passing the formamide vapor over a dehydrating catalyst which has been previously heated to a temperature of at least 1400° C. for at least ten hours.

3. Process of obtaining hydrocyanic acid from formamide which comprises vaporizing formamide and passing the formamide vapor over alumina which has been previously heated to a temperature of at least 1400° C. for a period of at least ten hours.

4. Process of obtaining hydrocyanic acid from formamide which comprises vaporizing formamide and passing the formamide vapor over precipitated alumina which has been previously heated to a temperature of at least 1400° C. for a period of at least ten hours.

5. Process of obtaining hydrocyanic acid from formamide which comprises vaporizing formamide and passing the formamide vapor over alumina which has been previously heated to a temperature exceeding 1000° C. for at least ten hours.

6. Process of obtaining hydrocyanic acid from formamide which comprises vaporizing formamide and passing the formamide vapor over thoria which has been previously heated to a temperature exceeding 1000° C. for at least ten hours.

7. Process of obtaining hydrocyanic acid from formamide which comprises vaporizing formamide and passing the formamide vapor over zirconia which has been previously heated to a temperature exceeding 1000° C. for at least ten hours.

8. Process of obtaining hydrocyanic acid from formamide which comprises vaporizing formamide and passing the formamide vapor over thoria which has been previously heated to a temperature of at least 1400° C. for a period of at least ten hours.

9. Process of obtaining hydrocyanic acid from formamide which comprises vaporizing formamide and passing the formamide vapor over zirconia which has been previously heated to a temperature of at least 1400° C. for a period of at least ten hours.

In witness whereof, I have hereunto signed my name this 13th day of December, 1928.

THOMAS EWAN.